(12) United States Patent  
Kasino et al.

(10) Patent No.: US 8,811,135 B1  
(45) Date of Patent: Aug. 19, 2014

(54) DISK DRIVE COMPONENT FLOW FIXTURE

(75) Inventors: Mohamad Khairul Kasino, Shah Alam (MY); Chong Tak Cheam, Shah Alam (MY)

(73) Assignee: Western Digital Technologies, Inc., Irvine, CA (US)

( * ) Notice: Subject to any disclaimer, the term of this patent is extended or adjusted under 35 U.S.C. 154(b) by 0 days.

(21) Appl. No.: 13/425,193

(22) Filed: Mar. 20, 2012

(51) Int. Cl.  
*G11B 5/09* (2006.01)

(52) U.S. Cl.  
USPC ............................. 369/53.1; 369/47.1; 360/31

(58) Field of Classification Search  
None  
See application file for complete search history.

(56) References Cited

U.S. PATENT DOCUMENTS

| | | | |
|---|---|---|---|
| 6,378,195 B1 | 4/2002 | Carlson | |
| 7,694,411 B2 | 4/2010 | Nayar et al. | |
| 2003/0175098 A1* | 9/2003 | Koh et al. | 414/222.06 |
| 2005/0235510 A1 | 10/2005 | Ly | |
| 2006/0104762 A1* | 5/2006 | Yao et al. | 414/405 |

\* cited by examiner

*Primary Examiner* — Muhammad N Edun

(57) ABSTRACT

A disk drive component flow fixture is described including a base fixture, and one or more child fixtures. Each of the one or more child fixtures is configured, for example, for removable insertion into the base fixture, and to receive a disk drive component. In an embodiment, a method for analysis of disk drive components is described using the disk drive component flow fixture, the method including inserting a first child fixture into a base fixture, placing a first disk drive component for a first type of disk drive onto the first child fixture, and performing an analysis of the first disk drive component.

18 Claims, 11 Drawing Sheets

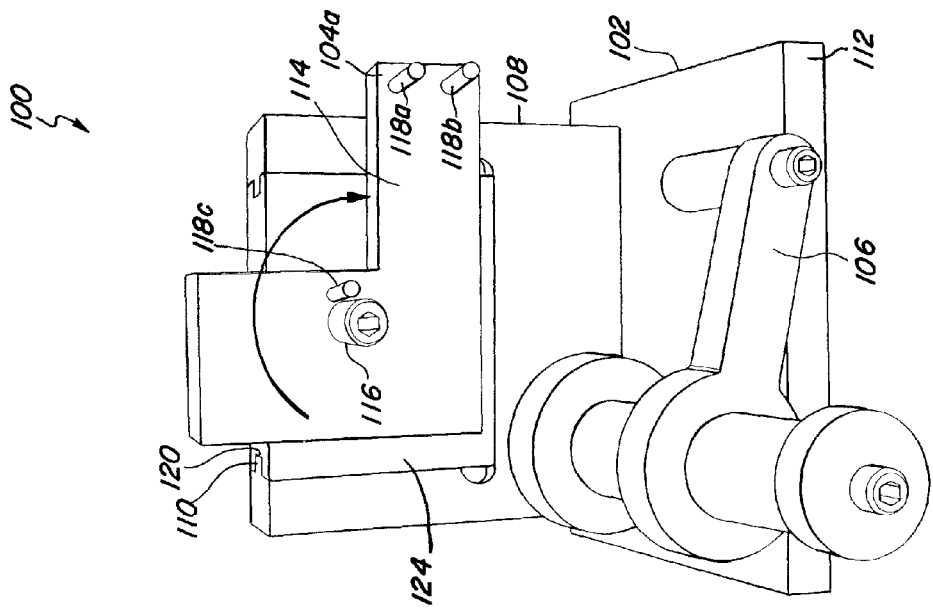
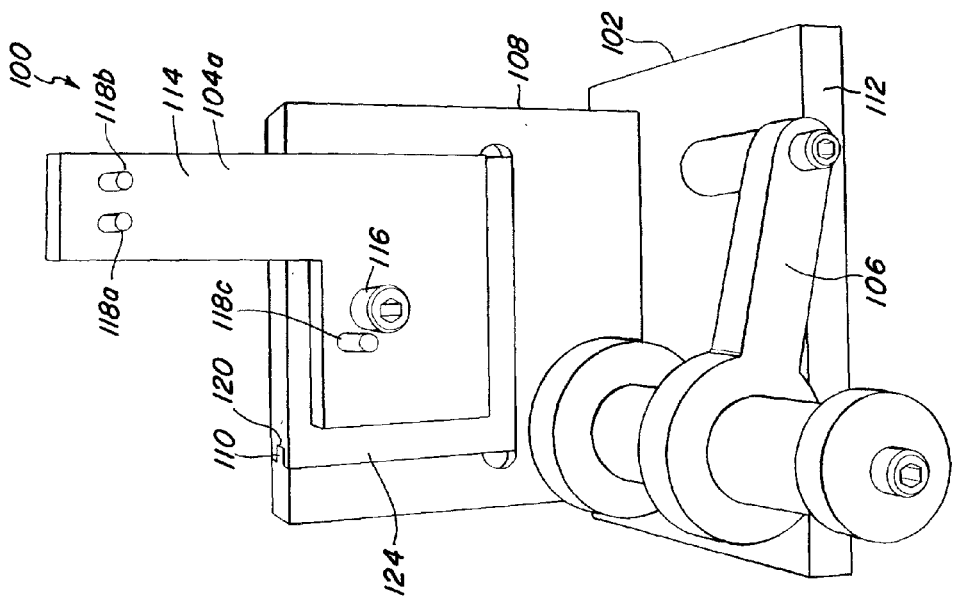

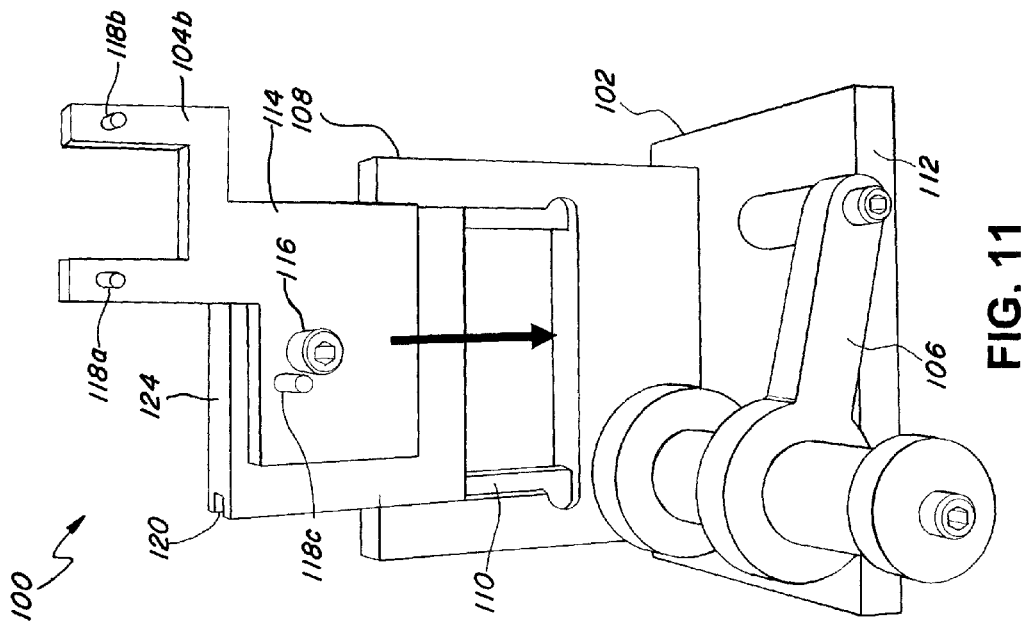
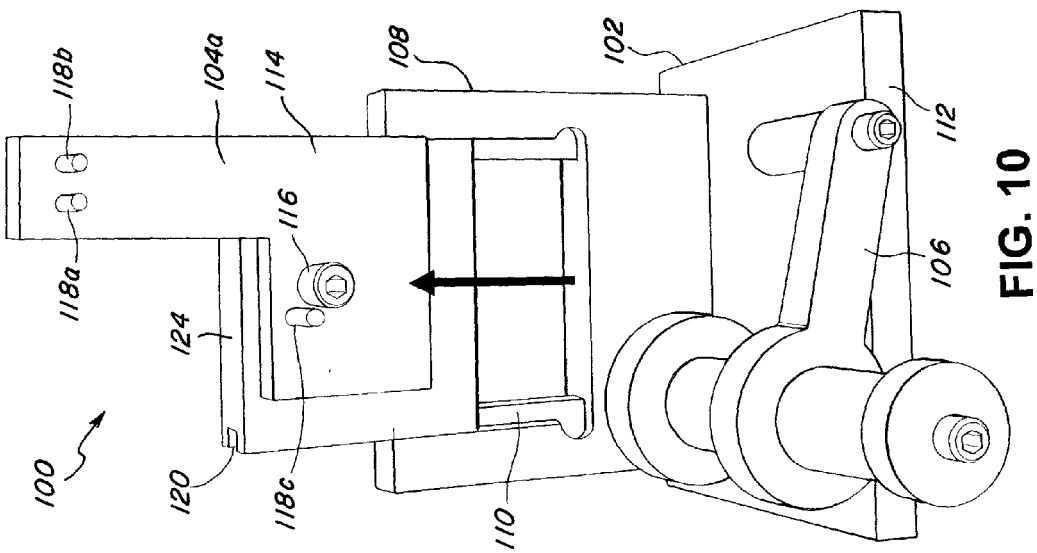

DISK DRIVE COMPONENT FLOW FIXTURE

BACKGROUND

During a quality control process for a disk drive, a disk drive component is analyzed by placing the disk drive component onto a conventional flow fixture. This allows a user to perform a visual mechanical inspection of the disk drive component to determine whether there are any defects in the disk drive component. However, to view a slider ID of the disk drive component, the user will have to remove the disk drive component from the conventional flow fixture, rotate the disk drive component by hand, and then view the slider ID under a scope. This process can be cumbersome, as it places physical and time demands on the user.

Furthermore, when a different type of disk drive needs to be analyzed, the conventional flow fixture must be replaced with a different conventional flow fixture designed for the different type of disk drive. This process can be time consuming since the whole conventional flow fixture must be replaced.

Also, maintaining many different types of conventional flow fixtures for the different types of disk drives that need to be analyzed can be expensive. These problems are magnified in a quality control facility where hundreds if not thousands of conventional flow fixtures are used.

BRIEF DESCRIPTION OF THE DRAWINGS

The features and advantages of the present embodiments will become more apparent from the detailed description set forth below when taken in conjunction with the drawings, wherein:

FIG. 6 depicts a disk drive component reception unit in a first position according to an embodiment;

FIG. 7 depicts a disk drive component reception unit in a second position according to an embodiment;

FIG. 10 depicts a first child fixture being removed from a base fixture according to an embodiment;

FIG. 11 depicts a second child fixture being inserted into a base fixture according to an embodiment;

DETAILED DESCRIPTION

In the following detailed description, numerous specific details are set forth to provide a full understanding of the embodiments disclosed. It will be apparent, however, to one ordinarily skilled in the art that the various embodiments may be practiced without some of these specific details. In other instances, well-known structures and techniques have not been shown in detail to avoid unnecessarily obscuring the various embodiments.

Figure 1:
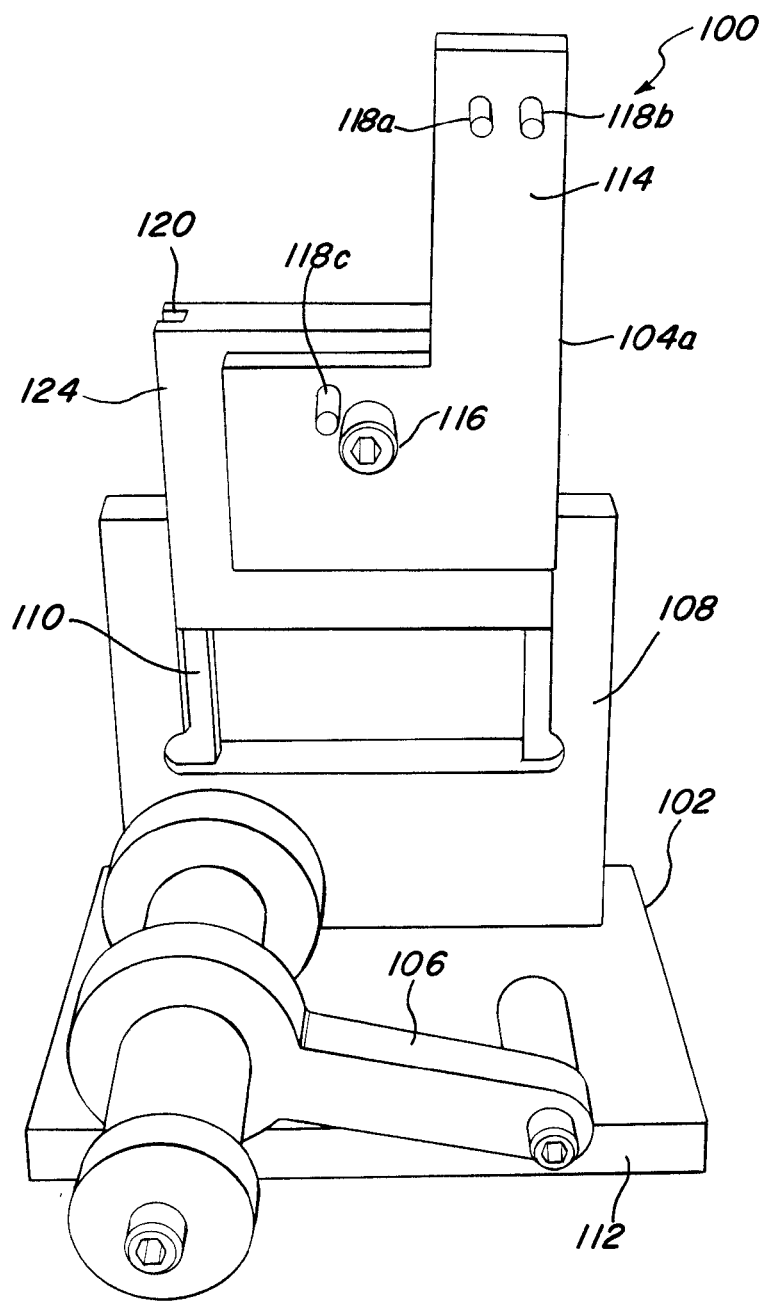
FIG. 1 depicts a disk drive component flow fixture including a first child fixture and a base fixture according to an embodiment.

With reference to FIG. 1, in an embodiment, a disk drive component flow fixture 100 includes, for example, a base fixture 102 and a child fixture 104a. In an embodiment, a platform 112 in the base fixture 102 is utilized to support the base fixture 102 and the child fixture 104a.

Figure 2:
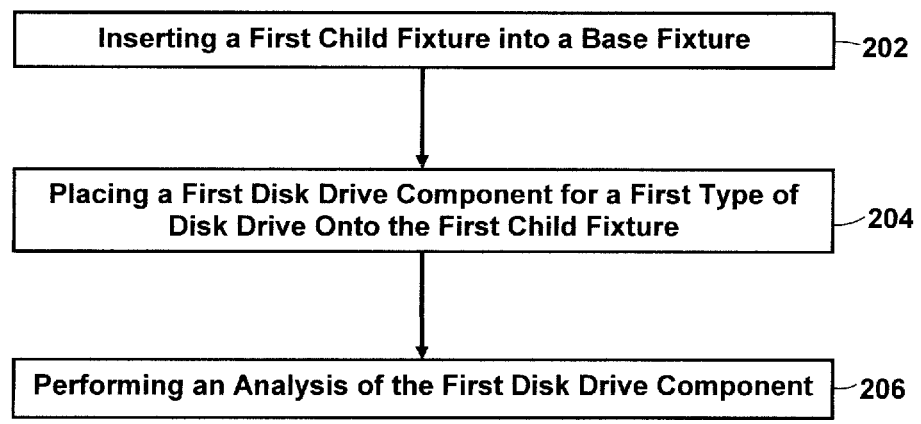
FIG. 2 depicts a process according to an embodiment.
Figure 3:
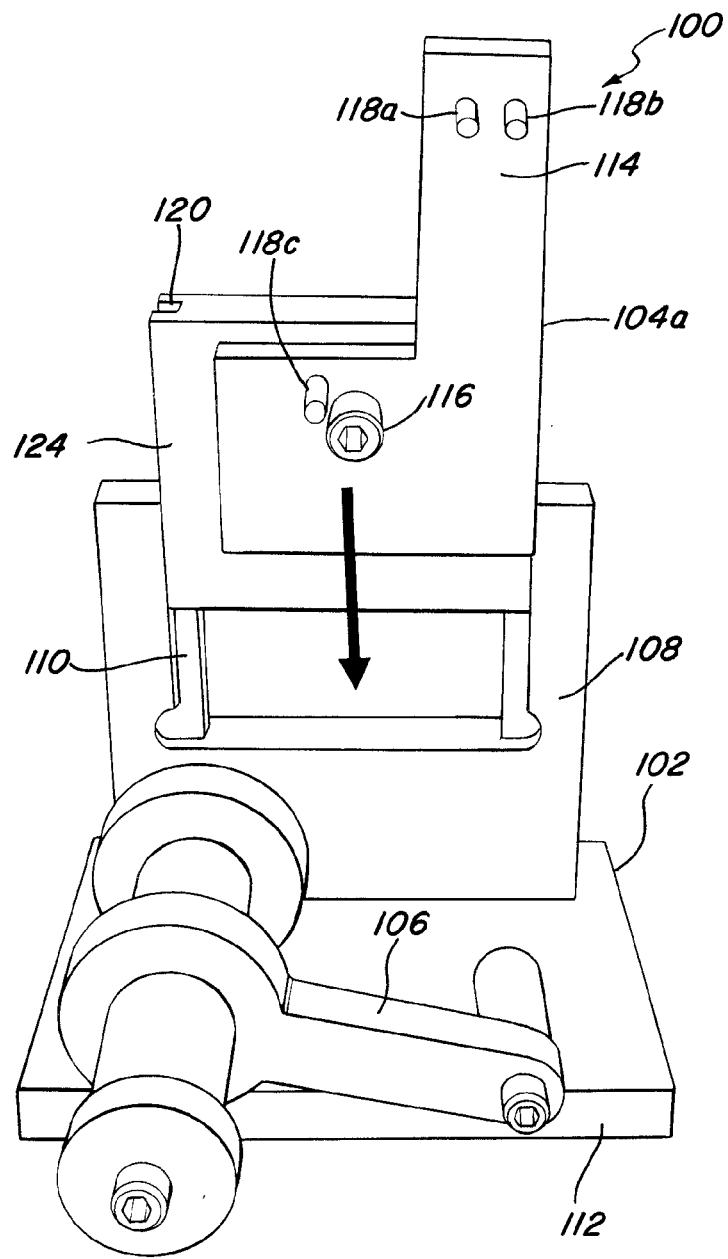
FIG. 3 depicts a first child fixture being inserted into a base fixture according to an embodiment.

The child fixture 104a is configured for removable insertion into the base fixture 102 such that the child fixture 104a can be used to analyze a disk drive component of a disk drive, as seen for example in a process disclosed in FIG. 2. In an embodiment in Block 202, the child fixture 104a is inserted into the base fixture 102 as seen in FIG. 3 In an embodiment, an insertion unit 124 of the child fixture 104a is inserted into a child fixture reception unit 108 of the base fixture 102. In an embodiment, a first locking mechanism 110 of the child fixture reception unit 108 and a second locking mechanism 120 of the insertion unit 124 cooperate with each other to prevent lateral movement of the child fixture 104a.

In an embodiment as shown in FIGS. 1 and 3, the first locking mechanism 110 comprises a beam, while the second locking mechanism 120 comprises a slot. However, in another embodiment, the first locking mechanism comprises the slot, while the second locking mechanism comprises the beam. In an embodiment, the first locking mechanism 110 and the second locking mechanism 120 comprise alternate locking devices which cooperate to prevent lateral movement of the child fixture 104a when the child fixture 104a is inserted into the base fixture 102.

Figure 4:
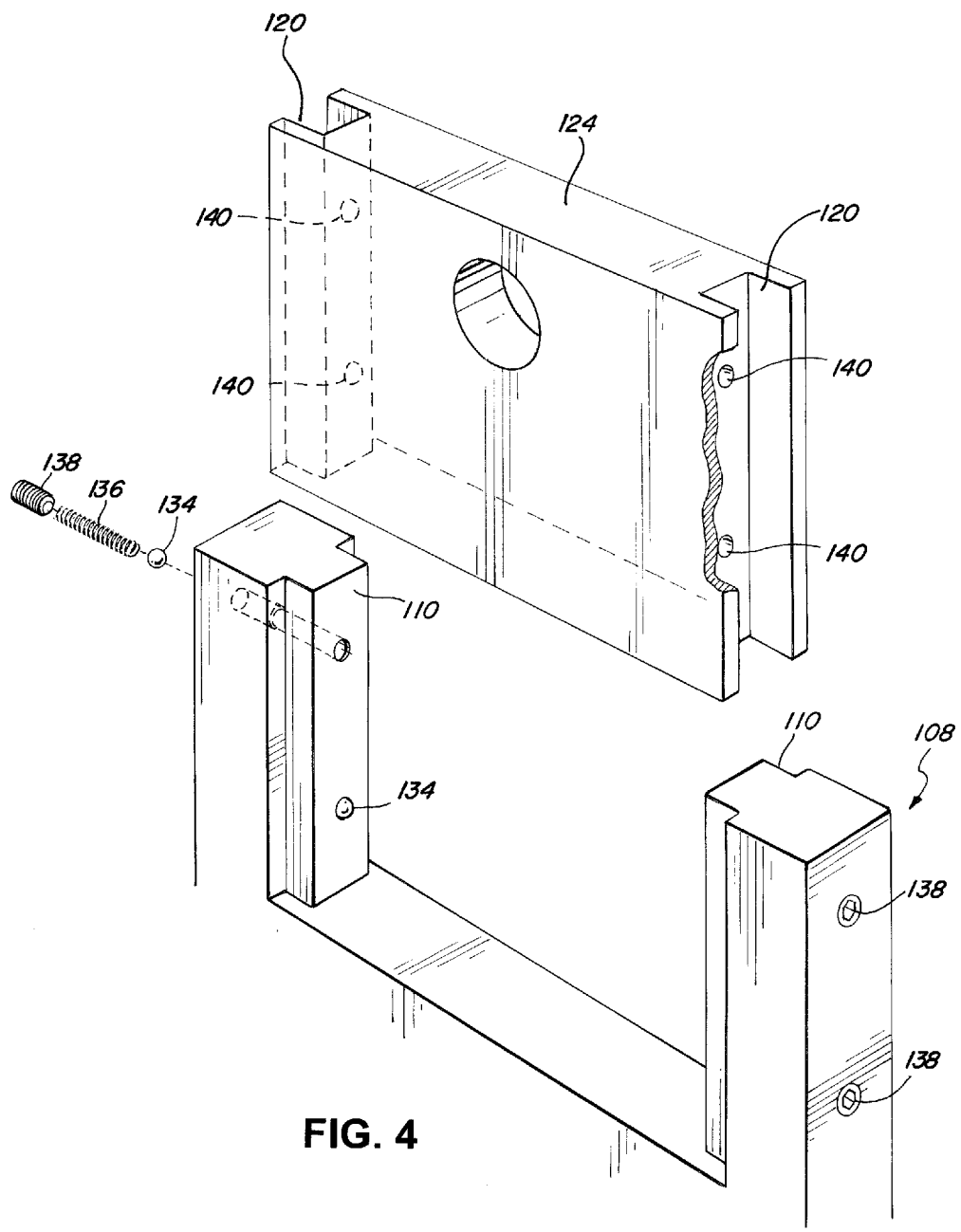
FIG. 4 depicts a base fixture including ball bearings and a child fixture including ball sockets according to an embodiment.

Furthermore, in an embodiment seen in FIG. 4, the child fixture reception unit 108 includes ball bearings 134 which are spring loaded by a spring 136 and stopped by a stopper 138. The spring 136 biases the ball bearings 134 against the stopper 138. The ball bearings 134 can be used, for example, to prevent accidental vertical movement of the child fixture 104a. In an embodiment, the ball bearings 134 can be urged in a first direction as the insertion unit 124 is inserted into the child fixture reception unit 108. However, when the ball bearings 134 encounter ball sockets 140 in the insertion unit 124, the spring 136 urges the ball bearings 134 in a second direction into the ball sockets 140.

In an embodiment, the ball bearings 134 and the ball sockets 140 cooperate with each other to prevent accidental vertical movement of the insertion unit 124 and the child fixture 104a. To remove the insertion unit 124 and the child fixture 104a, a user can provide sufficient force in a vertical direction to overcome the force of the spring 136 and urge the ball bearings 134 in the first direction. Once the ball bearings 134 are urged in the first direction, the ball bearings 134 will roll against the insertion unit 124 and generally provide little resistance for vertical movement of the insertion unit 124.

Although the ball bearings 134, the spring 136 and the stopper 138 are located on the child fixture reception unit 108 in FIG. 4, in an embodiment, the ball bearings 134, the spring 136 and the stopper 138 are located on the insertion unit 124. Likewise, although the ball sockets 140 are located in the insertion unit 124, in an embodiment, the ball sockets 140 are located on the child fixture reception unit 108. Furthermore, in an embodiment, alternate locking mechanisms instead of or in conjunction with the ball bearings 134, the spring 136, the stopper 138, or the ball sockets 140 can be used to prevent accidental vertical movement of the child fixture 104a.

Figure 5:
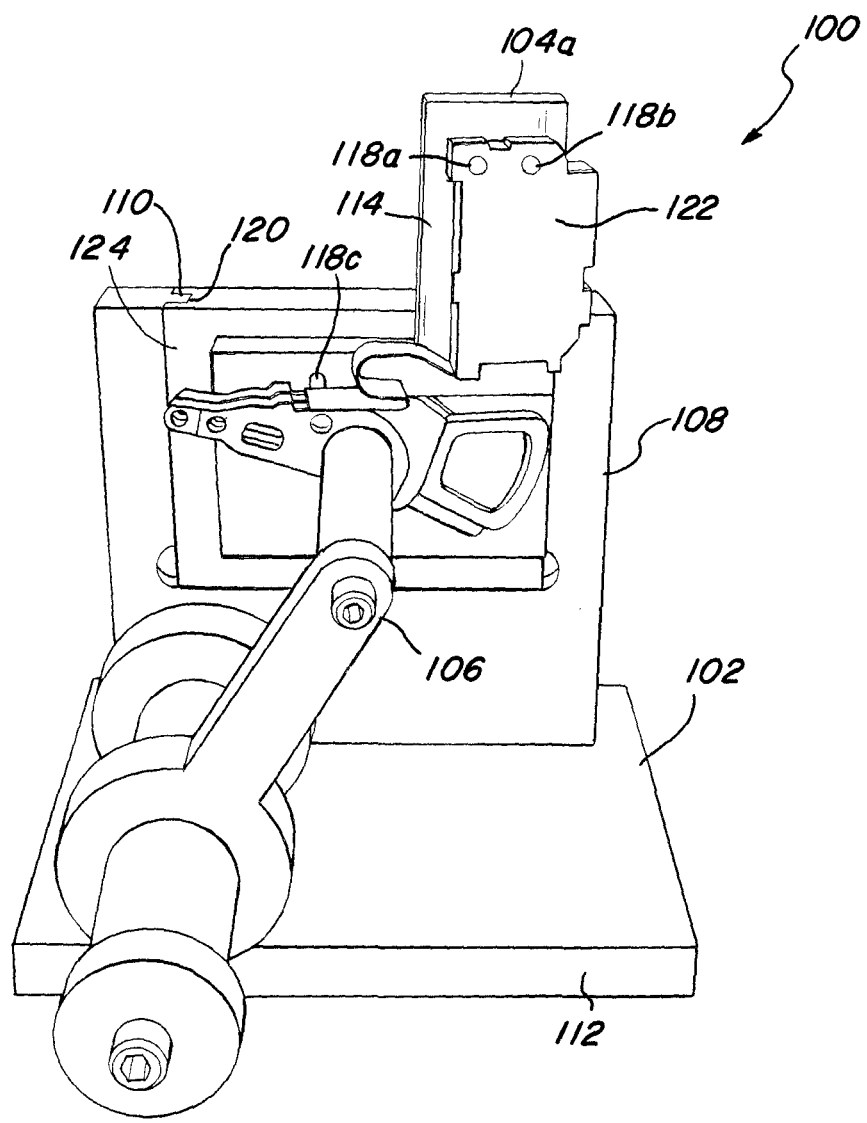
FIG. 5 depicts a disk drive component attached to a disk drive component reception unit according to an embodiment.

In an embodiment in Block 204, a disk drive component 122 is placed onto the child fixture 104a, as seen in FIG. 5 In an embodiment, the disk drive component 122 comprises a head gimbal assembly, an actuator, a pivot, a voice coil, a flip chip on flex ("FCOF"), a head stack assembly, or any combination thereof. Furthermore, the disk drive component reception unit 114 comprises various pins 118a, 118b, and 118c which are used to receive the disk drive component 122.

In an embodiment, once the disk drive component 122 is placed onto the disk drive component reception unit 114, a rotatable clamp 106 in the base fixture 102 can be rotated to apply pressure onto the disk drive component 122 to hold the disk drive component 122 onto the child fixture 104a as seen in FIG. 5 In an embodiment, the rotatable clamp 106 can be biased by a spring (not shown) to apply pressure on the disk drive component 122 to hold the disk drive component 122 onto the child fixture 104a.

In an embodiment in Block 206, an analysis of the disk drive component 122 is performed by rotating the disk drive component reception unit 114 between a first position and a second position. In an embodiment, a rotation unit 116 in the disk drive component reception unit 114 is configured to rotate the disk drive component reception unit 114 between a first position and a second position. For example, in FIG. 6, the disk drive component reception unit 114 is in a first position, while in FIG. 7 the disk drive component reception unit 114 is in a second position. In an embodiment, the first position and the second position can be separated by 90 degrees. However, in an embodiment, the first position and the second position are separated by other angles depending on the requirements for inspection of the disk drive component.

Figure 8A:
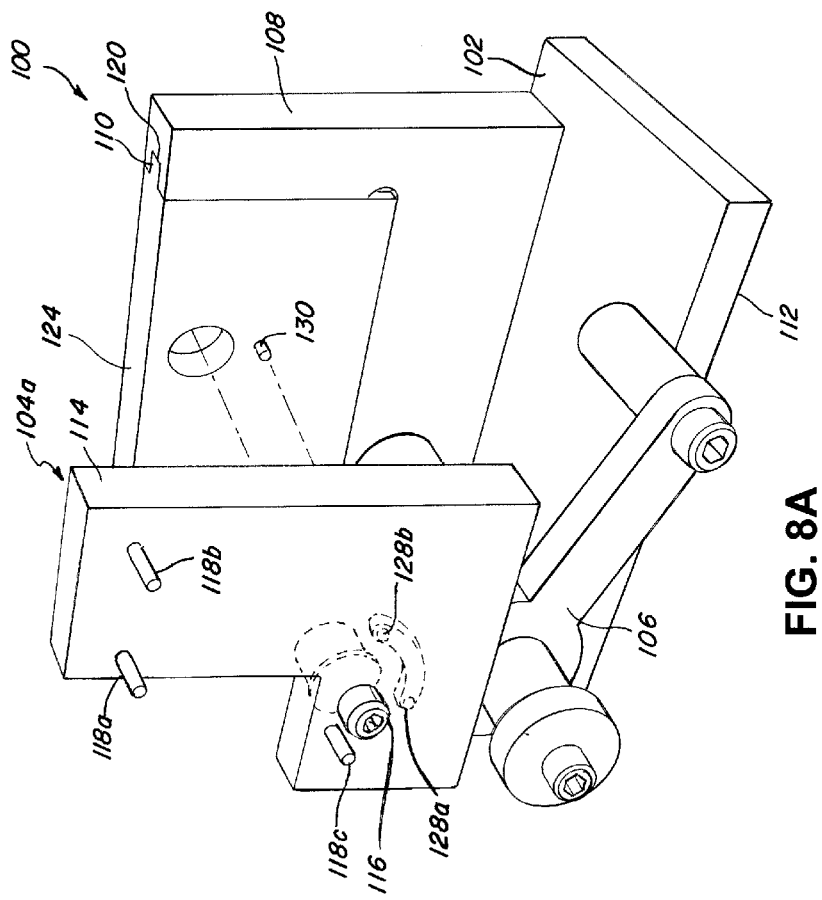
FIG. 8A depicts a rotational mechanism of a first child fixture according to an embodiment.
Figure 8B:
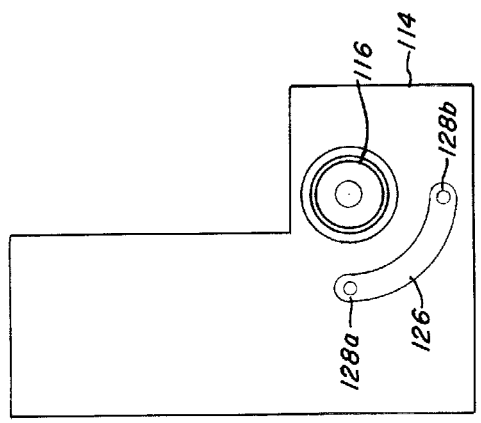
FIG. 8B depicts a back side of a disk drive component reception unit according to an embodiment.

In an embodiment, as seen in FIGS. 8A and 8B, the rotation of the disk drive component reception unit 114 is facilitated by a groove 126, stoppers 128a and 128b, and a pin 130. In an embodiment, the groove 126 and the stoppers 128a and 128b are located on the disk drive component reception unit 114 while the pin 130 is located on the insertion unit 124. When the disk drive component reception unit 114 rotates using the rotation unit 116, the groove 126 rotates with respect to the pin 130. In an embodiment, the stopper 128a cooperates with the pin 130 to prevent rotation of the disk drive component reception unit 114 past the first position, while the stopper 128b cooperates with the pin 130 to prevent rotation of the disk drive component reception unit 114 past the second position.

In the embodiment depicted in FIGS. 8A and 8B, the groove 126 and the stoppers 128a and 128b are located on the disk drive component reception unit 114, while the pin 130 is located on the insertion unit 124. However, in another embodiment, the groove 126, the stoppers 128 and 128b, are located on the insertion unit 124, while the pin 130 is located on the disk drive component reception unit 114. Furthermore, in an embodiment, alternative rotational components may be used aside from or in conjunction with the groove 126, the stoppers 128a and 128b, and the pin 130 to allow rotation of the disk drive component reception unit 114 between the first position and the second position.

Figure 9:
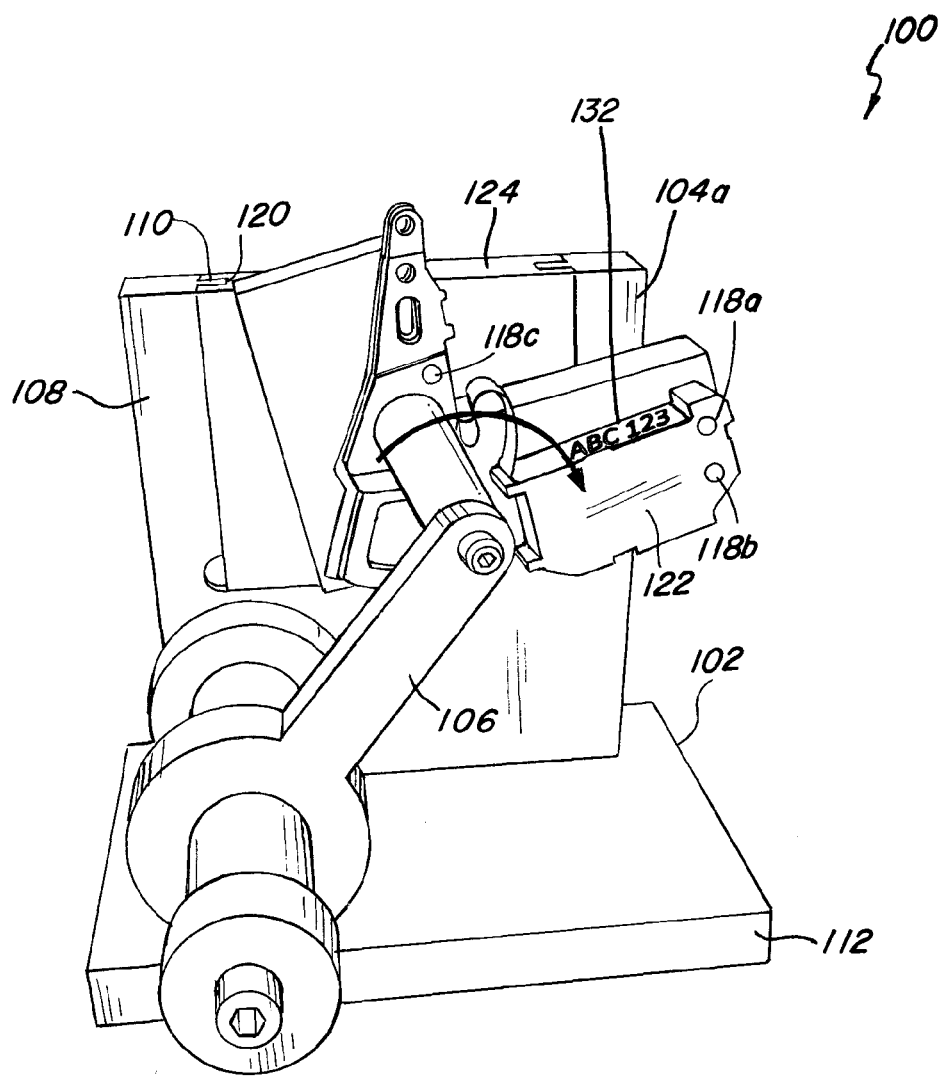
FIG. 9 depicts a disk drive component reception unit being rotated with a disk drive component attached to the disk drive component reception unit according to an embodiment.

In an embodiment, when the disk drive component reception unit 114 is in the first position, it permits a visual mechanical inspection of the disk drive component 122 as seen in FIG. 5. In an embodiment, when the disk drive component reception unit 114 is in the second position, it permits a slider ID inspection of the disk drive component, as seen in FIG. 9. For example, a slider ID 132 may be more easily inspected when the disk drive component reception unit 114 is in the position shown in FIG. 9. In an embodiment, the visual mechanical inspection or the slider ID inspection can be performed using a microscope, a video camera, an image sensor, a monitor, a computer, or any combination thereof.

In an embodiment, this ability to rotate can eliminate the need for the disk drive component 122 to be removed from the child fixture 104a and the disk drive component flow fixture 100 in order to perform the slider ID inspection. This can reduce, for example, an amount of time required to analyze the disk drive component 122. In the embodiment shown in FIG. 9, the slider ID 132 comprises an alphanumeric indication. In an embodiment, the slider ID 132 comprises alternative indications which can identify the disk drive component 122 either generally or uniquely. In an embodiment, the slider ID 132 identifies a type of disk drive which utilizes the disk drive component 122. In an embodiment, the slider ID 132 identifies the specific disk drive which utilizes the disk drive component 122.

Figure 12:
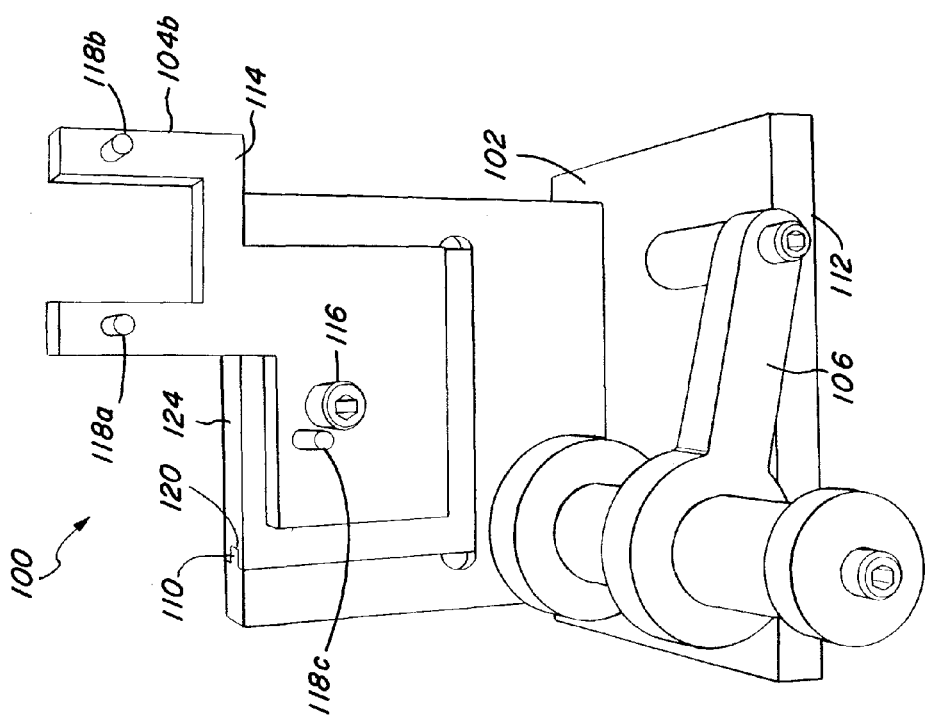
FIG. 12 depicts the second child fixture inserted into a base fixture according to an embodiment.

In an embodiment, the child fixture 104a can be removed from the base fixture 102 as seen, for example, in FIG. 10. In an embodiment, the disk drive component flow fixture 100 further comprises a child fixture 104b. The child fixture 104b can be inserted into the base fixture 102 as seen in FIGS. 11 and 12. The child fixture 104b is similar to the child fixture 104a, except that the child fixture 104b is configured to receive a disk drive component from a different type of disk drive than the disk drive component that the child fixture 104a is configured to receive.

In an embodiment, the child fixture 104a is configured to receive a first disk drive component for a first type of disk drive and the child fixture 104b is configured to receive a second disk drive component for a second type of disk drive different than the first type of disk drive. In an embodiment, a shape of the disk drive component reception unit 114 for the child fixture 104a is different than a shape of the disk drive component reception unit 114 for the child fixture 104b to allow for the reception of the disk drive components from the different types of disk drives. In addition, in an embodiment, a location of the pins 118a-c for the child fixture 104a is different than a location of the pins 118a-c for the child fixture 104b to allow for the reception of the disk drive components from the different types of disk drives.

Figure 13:
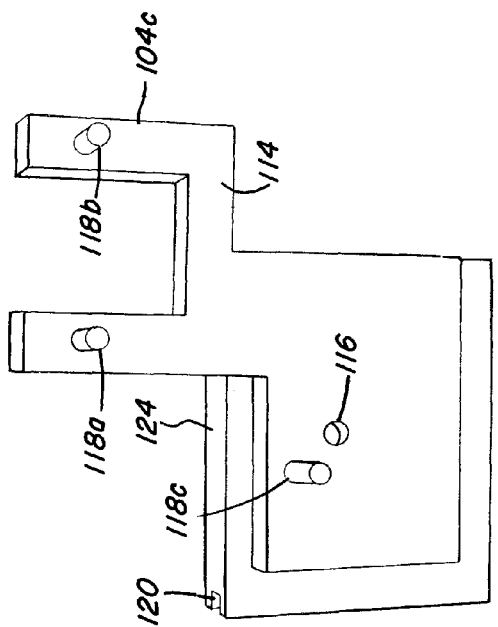
FIG. 13 depicts a child fixture according to an embodiment.
Figure 14:
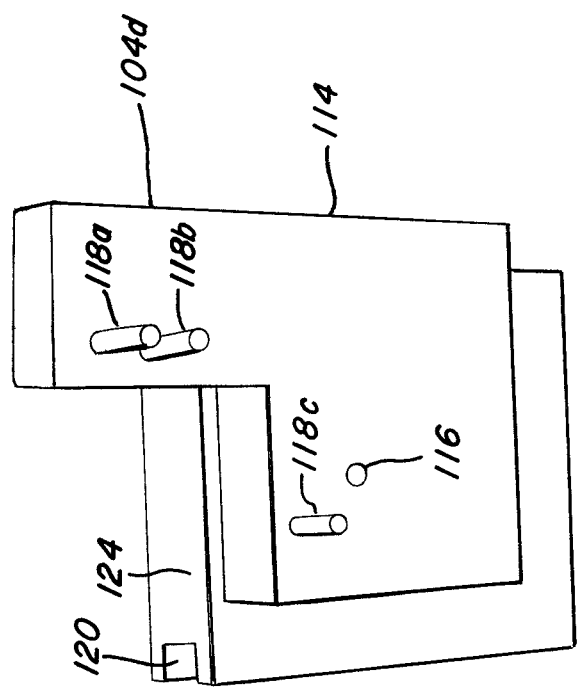
FIG. 14 depicts a child fixture according to an embodiment.

In an embodiment, the disk drive component flow fixture 100 can also comprise additional child fixtures, such as the child fixture 104c shown in FIG. 13 and the child fixture 104d shown in FIG. 14. The child fixtures 104c and 104d can also be configured to receive disk drive components from different types of disk drives. Although the child fixtures 104a-d are depicted, in an embodiment, the disk drive component flow fixture 100 can comprise additional or different child fixtures. In an embodiment, each of the child fixtures is configured to receive a disk drive component for a different type of disk drive.

In an embodiment, to analyze disk drive components of different types of disk drives, a first child fixture, such as the child fixture 104a, may be inserted into the base fixture 102. A first disk drive component for a first type of disk drive is analyzed, for example, using the first child fixture. The first child fixture is removed and replaced with a second child fixture, such as the child fixture 104b. A second disk drive component for a second type of disk drive is analyzed, for example, using the second child fixture.

In an embodiment, only the child fixtures need to be replaced for an analysis of the disk drive components of different types of disk drives to be performed. In an embodiment, a total number of disk drive component flow fixture 100 required to analyze the disk drive components from different types of disk drives can be reduced since a single disk drive component flow fixture comprising multiple child fixtures can be used to analyze the disk drive components from different types of disk drives. In an embodiment the disk drive component flow fixture 100 provides a cost-effective manner to analyze the disk drive components of different types of disk drives since a cost of the child fixture is generally less than a cost of the conventional flow fixture.

Furthermore, in an embodiment, the removably insertable nature of the child fixture allows the disk drive component flow fixture 100 to be used to analyze disk drive components for different types of disk drives in an efficient manner since only the child fixture, instead of the complete disk drive component flow fixture 100 need be replaced when disk drive components for different type of disk drives need to be analyzed.

The previous description of the disclosed examples is provided to enable any person of ordinary skill in the art to make or use the disclosed methods and apparatus. Various modifications to these examples will be readily apparent to those skilled in the art, and the principles defined herein may be applied to other examples without departing from the spirit or scope of the disclosed method and apparatus. The described embodiments are to be considered in all respects only as illustrative and not restrictive and the scope of the disclosure is, therefore, indicated by the appended claims rather than by the foregoing description. All changes which come within the meaning and range of equivalency of the claims are to be embraced within their scope.

What is claimed is:

1. A hard disk drive component flow fixture comprising:
a base fixture having a child fixture reception unit; and
one or more child fixtures, wherein each of the one or more child fixtures is configured for removable insertion into the child fixture reception unit of the base fixture, and to receive a disk drive component, and
wherein each of the one or more child fixtures comprises a disk drive component reception unit configured to receive the disk drive component, and to rotate from a first position to a second position.

2. The flow fixture of claim 1 wherein the first position and the second position are separated by 90 degrees.

3. The flow fixture of claim 1 wherein the first position permits a visual mechanical inspection of the disk drive component, and the second position permits a slider ID inspection of the disk drive component.

4. The flow fixture of claim 1 wherein the base fixture comprises a rotatable clamp configured to apply pressure on the disk drive component to maintain the disk drive component on the disk drive component reception unit.

5. The flow fixture of claim 1 wherein the disk drive component comprises a head gimbal assembly.

6. The flow fixture of claim 1 wherein the disk drive component comprises an actuator, a pivot, a voice coil, or a flip chip on flex ("FCOF").

7. The flow fixture of claim 1 wherein the disk drive component comprises a head stack assembly.

8. The flow fixture of claim 1 wherein the base fixture comprises a first locking mechanism and each of the one or more child fixtures comprises a second locking mechanism, wherein the first locking mechanism and the second locking mechanism are configured to cooperate with each other to allow the one or more child fixtures to be inserted into the base fixture, and prevent lateral movement of the one or more child fixtures.

9. A method for analysis of disk drive components using a hard disk drive component flow fixture comprising a base fixture and one or more child fixtures configured to be removably inserted into the base fixture and to receive a disk drive component comprising:
inserting a first child fixture into a child fixture reception unit of a base fixture;
placing a first disk drive component for a first type of disk drive onto the first child fixture; and
performing an analysis of the first disk drive component,
wherein the disk drive component flow fixture further comprises a second child fixture configured to be removably inserted into the base fixture, and to receive a second disk drive component for a second type of disk drive different from the first type of disk drive.

10. The method of claim 9 further comprising:
removing the first child fixture from the base fixture;
inserting the second child fixture into the base fixture;
placing the second disk drive component onto the second child fixture; and
performing an analysis of the second disk drive component.

11. The method of claim 9 wherein the first disk drive component comprises at least one of a head gimbal assembly or a head stack assembly.

12. The method of claim 9 wherein the first disk drive component comprises an actuator, a pivot, a voice coil, or a flip chip on flex ("FCOF").

13. A hard disk drive component flow fixture comprising:
a base fixture having a child fixture reception unit; and
one or more child fixtures, wherein each of the one or more child fixtures is configured for removable insertion into the child fixture reception unit of the base fixture, and to receive a disk drive component, and
wherein the one or more child fixtures comprises a first child fixture configured to receive a first disk drive component for a first type of disk drive and a second child fixture configured to receive a second disk drive component for a second type of disk drive different than the first type of disk drive.

14. A method for analysis of disk drive components using a hard disk drive component flow fixture comprising a base fixture and one or more child fixtures configured to be removably inserted into the base fixture and to receive a disk drive component comprising:
inserting a first child fixture into a child fixture reception unit of a base fixture, wherein the first child fixture comprises a disk drive component reception unit configured to receive a first disk drive component for a first type of disk drive, and to rotate from a first position to a second position;
placing the first disk drive component onto the first child fixture; and
performing an analysis of the first disk drive component.

15. The method of claim 14 wherein the first position and the second position are separated by 90 degrees.

16. The method of claim 14 wherein the first position permits a visual mechanical inspection of the first disk drive component, and the second position permits a slider ID inspection of the first disk drive component.

17. The method of claim 14 wherein performing an analysis of the first disk drive component comprises:
performing a visual mechanical inspection of the first disk drive component;
rotating the disk drive component reception unit from the first position to the second position; and
performing an analysis of a slider ID on the first disk drive component.

18. The method of claim 14 further comprising applying pressure, using a rotatable clamp of the base fixture, on the first disk drive component to maintain the first disk drive component on the disk drive component reception unit.

* * * * *